United States Patent
Hara

(10) Patent No.: US 11,999,233 B2
(45) Date of Patent: Jun. 4, 2024

(54) DRIVER MONITORING DEVICE, STORAGE MEDIUM STORING COMPUTER PROGRAM FOR DRIVER MONITORING, AND DRIVER MONITORING METHOD

(71) Applicant: TOYOTA JIDOSHA KABUSHIKI KAISHA, Toyota (JP)

(72) Inventor: Kenichiroh Hara, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 18/056,833

(22) Filed: Nov. 18, 2022

(65) Prior Publication Data
US 2023/0226909 A1     Jul. 20, 2023

(30) Foreign Application Priority Data
Jan. 18, 2022   (JP) .................................. 2022-005705

(51) Int. Cl.
*B60K 35/00*   (2024.01)
*B60K 35/10*   (2024.01)
*B60K 35/22*   (2024.01)

(52) U.S. Cl.
CPC .............. *B60K 35/00* (2013.01); *B60K 35/10* (2024.01); *B60K 35/22* (2024.01); *B60K 2360/1434* (2024.01); *B60K 2360/21* (2024.01)

(58) Field of Classification Search
CPC ................ B60K 35/00; B60K 2360/21; B60K 2360/1434; B60K 35/10; B60K 35/22
See application file for complete search history.

(56) References Cited

U.S. PATENT DOCUMENTS

| | | | |
|---|---|---|---|
| 11,393,238 B1 * | 7/2022 | Kentley-Klay ..... | B60W 30/025 |
| 11,919,465 B2 * | 3/2024 | Hosokawa ........ | B60R 21/01552 |
| 2003/0079929 A1 | 5/2003 | Takagi et al. | |
| 2006/0023890 A1 * | 2/2006 | Kaminuma ............. | H04S 3/008 |
| | | | 381/61 |
| 2006/0072792 A1 * | 4/2006 | Toda ..................... | B60R 25/255 |
| | | | 382/115 |
| 2007/0176402 A1 * | 8/2007 | Irie ........................ | G06V 40/10 |
| | | | 382/224 |

(Continued)

FOREIGN PATENT DOCUMENTS

| | | | |
|---|---|---|---|
| DE | 102004020255 B4 * | 3/2008 | ....... B60R 21/01538 |
| JP | 2003141513 A | 5/2003 | |

(Continued)

*Primary Examiner* — Chico A Foxx
(74) *Attorney, Agent, or Firm* — Dickinson Wright, PLLC

(57) ABSTRACT

A driver monitoring device has a processor configured to acquire number of passengers that are occupying a vehicle when the vehicle has begun to travel, to determine whether or not a driver is sitting in a driving seat based on an image near the driving seat of the vehicle which has been taken by an imaging unit and, when it has been determined that the driver is not seated in the driving seat, to determine that the driver is not seated in the driving seat if number of seated people, representing number of people that are sitting as detected by a seating sensor situated in each seat other than the driving seat of the vehicle, matches the number of passengers, and to determine that the driver is seated in the driving seat if the number of seated people is one less than the number of passengers.

8 Claims, 8 Drawing Sheets

(56) References Cited

U.S. PATENT DOCUMENTS

| | | | |
|---|---|---|---|
| 2008/0248736 A1* | 10/2008 | Aoki | B60H 1/00742 |
| | | | 454/75 |
| 2014/0121903 A1* | 5/2014 | Lee | B60K 35/00 |
| | | | 701/41 |
| 2014/0375543 A1* | 12/2014 | Ng-Thow-Hing | G06F 3/017 |
| | | | 345/156 |
| 2015/0055678 A1* | 2/2015 | Kawata | G01S 17/04 |
| | | | 374/121 |
| 2017/0046582 A1* | 2/2017 | Hoshiya | B60Q 3/80 |
| 2017/0129435 A1* | 5/2017 | Vitet | B60R 21/01546 |
| 2017/0261983 A1* | 9/2017 | Abe | B60W 30/182 |
| 2018/0022356 A1* | 1/2018 | McBride | G01S 17/931 |
| | | | 340/439 |
| 2019/0086917 A1 | 3/2019 | Okimoto et al. | |
| 2019/0118831 A1* | 4/2019 | Mimura | B60W 60/0053 |
| 2019/0155279 A1* | 5/2019 | Tayama | B60W 30/00 |
| 2019/0291744 A1* | 9/2019 | Mimura | B60W 10/04 |
| 2020/0065595 A1* | 2/2020 | Hyuga | G06V 40/166 |
| 2020/0290567 A1* | 9/2020 | Funyak | B60R 25/102 |
| 2021/0009141 A1* | 1/2021 | Lu | G06V 20/597 |
| 2021/0049386 A1* | 2/2021 | Wang | B60W 50/087 |
| 2022/0066551 A1* | 3/2022 | Taniguchi | G06F 3/013 |
| 2022/0368830 A1* | 11/2022 | Molin | H04N 5/76 |
| 2023/0205205 A1* | 6/2023 | Potnis | B60W 60/0051 |
| | | | 701/23 |

FOREIGN PATENT DOCUMENTS

| | | |
|---|---|---|
| JP | 2018149990 A | 9/2018 |
| JP | 2019069725 A | 5/2019 |
| WO | 2017158726 A1 | 9/2017 |

\* cited by examiner

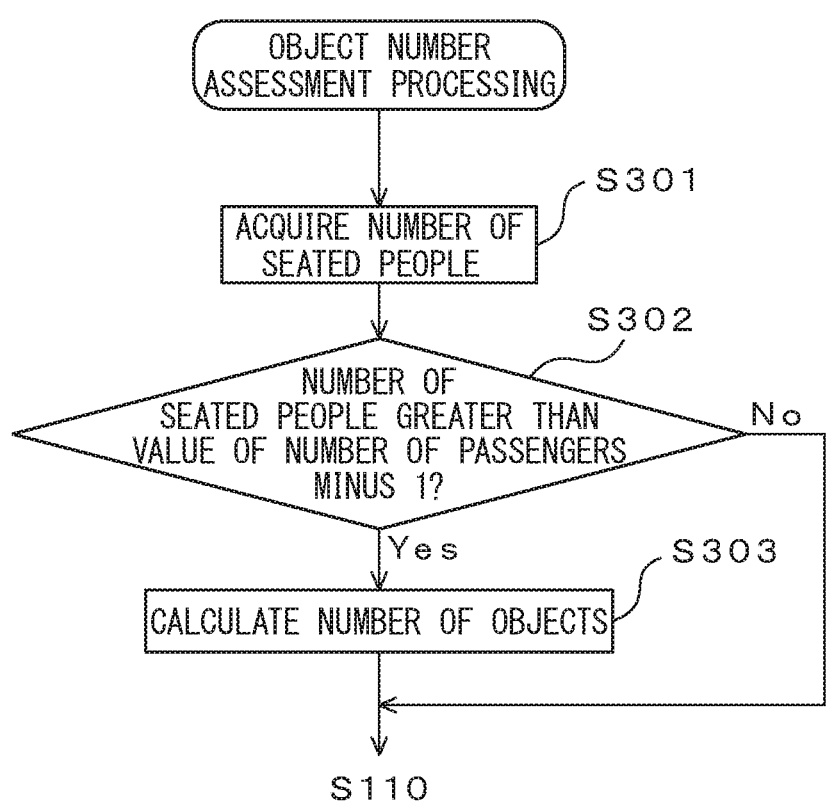

DRIVER MONITORING DEVICE, STORAGE MEDIUM STORING COMPUTER PROGRAM FOR DRIVER MONITORING, AND DRIVER MONITORING METHOD

FIELD

The present disclosure relates to a driver monitoring device, a storage medium storing a computer program for driver monitoring, and a driver monitoring method.

BACKGROUND

Autonomous control systems for vehicles monitor the degree of driver contribution to driving using sensors and the like (see International Patent Publication No. WO2017/158726, for example). The degree of contribution to driving required for a driver will differ depending on the level of autonomous control.

An autonomous control system monitors the driver and determines whether or not the driver is contributing to driving to the degree required for the level of autonomous control. Examples of means used for such monitoring include a seating sensor for the driving seat, a buckle sensor that detects whether the driver has fastened the seat belt of the driving seat, and a monitoring camera that takes an image to monitor the state of the driver.

In an autonomous control system for a vehicle that is being controlled at autonomous control level 3, it is desirable to be able to detect a state where the driver has fastened the seat belt of the driving seat and the driver is able to take over driving operation. In an autonomous control system for a vehicle that is being controlled at autonomous control level 3, therefore, it is preferred to have a driving seat buckle sensor, a driving seat seating sensor, and a monitoring camera.

SUMMARY

For production of a vehicle to be controlled at autonomous control level 3 from a vehicle capable of control at autonomous control level 2 or lower, it is advantageous from a cost standpoint to use parts such as sensors that are already mounted in the vehicle. A buckle sensor, a seating sensor in a seat other than the driving seat, and a monitoring camera, are also mounted in vehicles with autonomous control level 2 or lower.

However, for driving of a vehicle capable of control at autonomous control level 2 or lower, it is established that the driver is able to operate the vehicle when seated in the driving seat, and since it is therefore assumed that the driver is seated in the driving seat, no seating sensor is mounted in the driving seat.

It is possible to determine whether or not the driver is sitting in the driving seat by taking an image near the driving seat by the monitoring camera and identifying the predetermined location of the driver in the image. When the face of the driver has been identified in an image, for example, it can be determined that the driver is sitting in the driving seat. If the face of the driver sitting in the driving seat is facing to the side, however, the face of the driver cannot be identified in the image. Since the driver sitting in the driving seat may be facing toward the front even if the face of the driver has not been identified in the image, it has been necessary to make the assessment after waiting for a certain period of time until the face of the driver has been identified in the image. Using the image as the basis to determine whether or not the driver is sitting has therefore required a certain length of time, which has been problematic.

It is therefore an object of the present disclosure to provide a driver monitoring device that can more rapidly determine whether or not the driver is sitting in the driving seat, by immediately using a seating sensor in a seat other than the driving seat when it has been determined that the driver is not sitting in the driving seat based on an image taken near the driving seat.

According to one embodiment, the invention provides a driver monitoring device. The driver monitoring device has an acquisition unit that acquires number of passengers that are occupying a vehicle when the vehicle has begun to travel a first assessment unit that determines whether or not a driver is sitting in a driving seat based on an image near the driving seat of the vehicle which has been taken by an imaging unit and a second assessment unit that determines that the driver is not sitting in the driving seat if number of seated people, representing number of people that are sitting as detected by a seating sensor situated in each seat other than the driving seat of the vehicle, matches the number of passengers, and determines that the driver is sitting in the driving seat if the number of seated people is one less than the number of passengers, in cases where it has been determined by the first assessment unit that the driver is not seated in the driving seat.

This driver monitoring device preferably also has a control unit that notifies the driver to sit in the driving seat via a notification unit, when it has been determined by the second assessment unit that the driver is not sitting in the driving seat.

This driver monitoring device preferably also has a third assessment unit that determines whether or not the driver is sitting in the driving seat based on multiple images taken by the imaging unit, during a predetermined time after assessment by the second assessment unit, when it has been determined by the second assessment unit that the driver is sitting in the driving seat.

This driver monitoring device preferably also has a control unit that notifies the driver to sit in the driving seat via the notification unit, when it has been determined by the third assessment unit that the driver is not sitting in the driving seat.

The driver monitoring device also preferably further has a control unit that notifies the driver to sit in the driving seat via the notification unit, when the number of seated people does not match the number of passengers and the number of seated people is also not one less than the number of passengers.

The driver monitoring device also preferably has a fourth assessment unit that compares the number of seated people with the number of passengers, and if the number of seated people is greater than the value of the number of passengers minus 1, calculates the value of one added to the number of seated people minus the number of passengers as the number of objects placed on seats other than the driving seat, when it has been determined by the first assessment unit that the driver is sitting in the driving seat, and the second assessment unit determines that the driver is not sitting in the driving seat if the number of seated people minus the number of objects matches the number of passengers, or determines that the driver is sitting in the driving seat if the number of seated people minus the number of objects is one less than the number of passengers, after the number of objects has been calculated by the fourth assessment unit, in cases where it has been determined by the first assessment unit that the driver is not seated in the driving seat.

According to another embodiment there is provided a computer-readable, non-transitory storage medium storing a computer program and a computer program for driver monitoring. The computer program for driver monitoring causes a processor execute a process, the process includes acquiring number of passengers that are occupying a vehicle when the vehicle has begun to travel, determining whether or not a driver is sitting in a driving seat based on an image near the driving seat of the vehicle which has been taken by an imaging unit, and determining that the driver is not sitting in the driving seat if number of seated people, representing number of people that are sitting as detected by a seating sensor situated in each seat other than the driving seat of the vehicle, matches the number of passengers, or determining that the driver is sitting in the driving seat if the number of seated people is one less than the number of passengers, in cases where it has been determined that the driver is not sitting in the driving seat.

According to yet another embodiment of the invention there is provided a driver monitoring method. The driver monitoring method is carried out by a driver monitoring device and the method includes acquiring number of passengers that are occupying a vehicle when the vehicle has begun to travel, determining whether or not a driver is sitting in a driving seat based on an image near the driving seat of the vehicle which has been taken by an imaging unit, and determining that the driver is not sitting in the driving seat if number of seated people, representing number of people that are sitting as detected by a seating sensor situated in each seat other than the driving seat of the vehicle, matches the number of passengers, or determining that the driver is sitting in the driving seat if the number of seated people is one less than the number of passengers, in cases where it has been determined that the driver is not sitting in the driving seat.

The driver monitoring device of the disclosure can rapidly determine whether or not the driver is sitting in the driving seat, by using a seating sensor in a seat other than the driving seat when it has been determined that the driver is not sitting in the driving seat based on an image taken near the driving seat.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is an operation flow chart as Modified Example 2 for driver monitoring processing by the driver monitoring device of the embodiment.

DESCRIPTION OF EMBODIMENTS

Figure 1A:
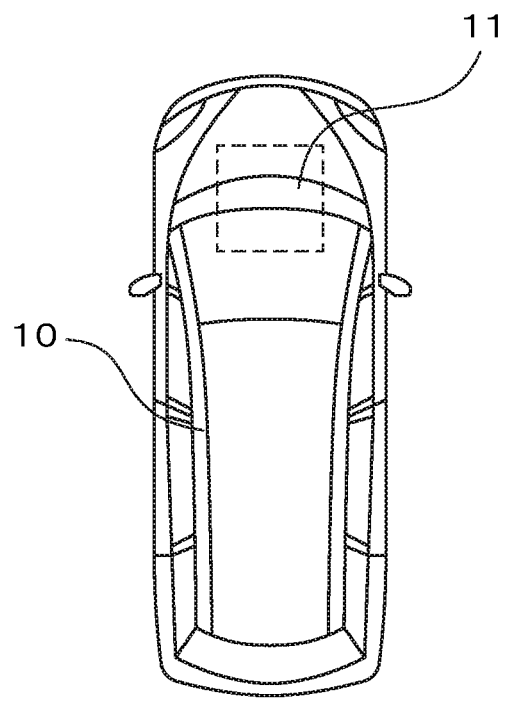
FIG. 1A is a diagram illustrating operation of the driver monitoring device of the embodiment in overview, and showing a vehicle.
Figure 1B:
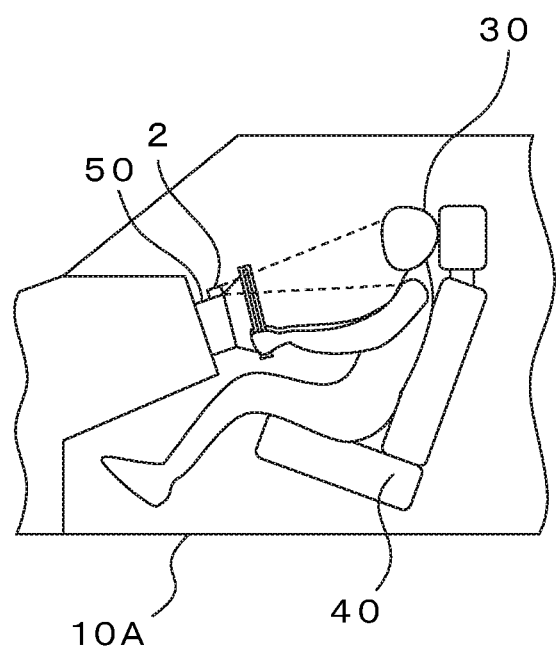
FIG. 1B is a diagram illustrating operation of the driver monitoring device of the embodiment in overview, where a monitoring camera is taking an image of the driver.
Figure 2A:
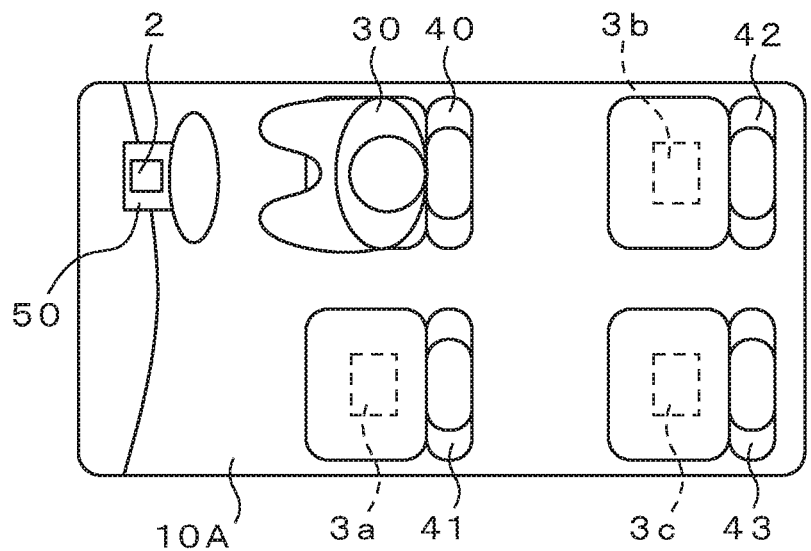
FIG. 2A is a diagram showing an example of a seat and driver state in a compartment (1).
Figure 2B:
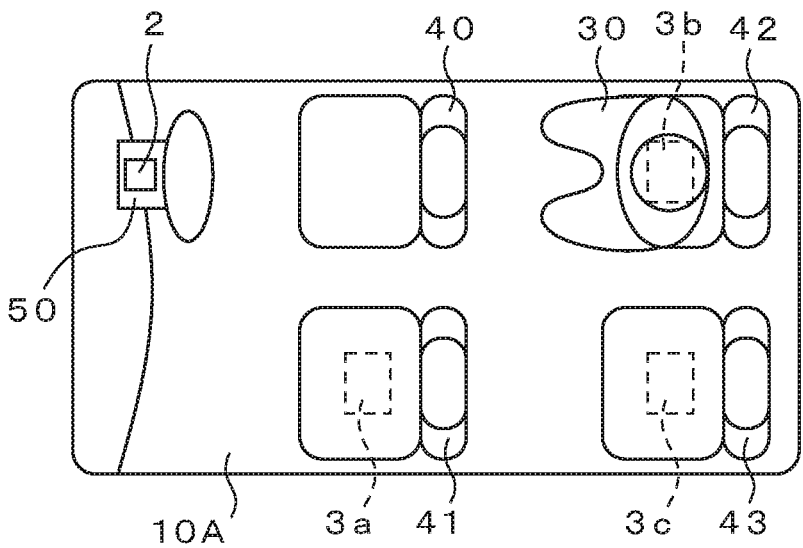
FIG. 2B is a diagram showing an example of a seat and driver state in a compartment (2).
Figure 2C:
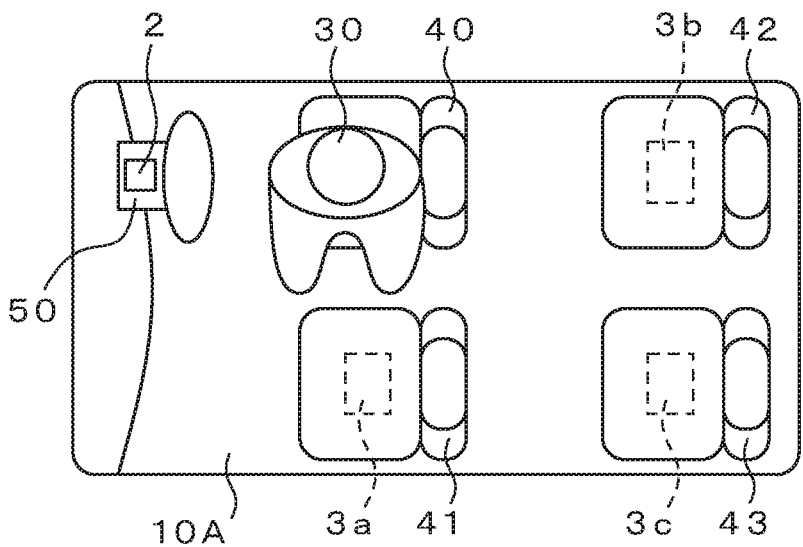
FIG. 2C is a diagram showing an example of a seat and driver state in a compartment (3).

FIG. 1A and FIG. 1B are diagrams illustrating operation of the driver monitoring device 11 of the embodiment in overview, where FIG. 1A shows the vehicle 10 and FIG. 1B shows the monitoring camera 2 taking an image of the driver 30. FIG. 2A to FIG. 2C are diagrams showing an example of a seat and state of the driver 30 in a compartment 10A.

As shown in FIG. 1A, the vehicle 10 has a driver monitoring device 11. As shown in FIG. 1B, the monitoring camera 2 which can take an image of the driver 30 seated in the driving seat 40 is disposed on the steering column 50 in the compartment 10A. The vehicle 10 may be an autonomous vehicle.

As shown in FIG. 2A to FIG. 2C, the driving seat 40 in which the driver 30 sits, a passenger seat 41, and back seats 42, 43 are disposed in the compartment 10A of the vehicle 10. Seating sensors 3a to 3c are disposed in seats 41 to 43, respectively, apart from the driving seat. The seating sensors 3a to 3c detect seating of passengers, each outputting a seating signal indicating that a passenger is seated, to the driver monitoring device 11. The driver monitoring device 11 can rapidly acquire the number of seated people based on the seating signal input from the seating sensors 3a to 3c. Preferably, a buckle sensor (not shown) that detects whether the passenger has fastened the seat belt, is also disposed in each seat.

The driver monitoring device 11 acquires the number of passengers indicating the number of passenger persons in the vehicle 10 when the vehicle 10 begins to travel. For example, the driver monitoring device 11 acquires the number of passengers input by the driver through a user interface 4 (see FIG. 3). In the example shown in FIG. 2A to FIG. 2C, the number of passengers is one, being the driver alone.

The driver monitoring device 11 determines whether or not the driver 30 is seated in the driving seat 40 based on a monitor image taken by the monitoring camera 2 when the vehicle 10 begins to travel. By determining whether or not the face of the driver appears in the monitor image using an identifying mechanism such as a neural network (CNN), the driver monitoring device 11 can rapidly determine whether or not the driver 30 is seated in the driving seat 40.

In the example shown in FIG. 2A, the driver 30 is seated in the driving seat 40 and facing toward the front of the vehicle 10. The face of the driver 30 facing forward with respect to the monitoring camera 2 appears in the monitor image. The driver monitoring device 11 determines that the driver 30 is seated in the driving seat 40 based on the monitor image.

In the example shown in FIG. 2B, the driver 30 is seated in the back seat 42. The face of the driver 30 does not appear in an identifiable manner in the monitor image. Based on the monitor image, the driver monitoring device 11 determines that the driver 30 is not seated in the driving seat 40. When the driver monitoring device 11 has determined that the driver 30 is not seated in the driving seat 40 based on the monitor image, it further determines whether or not the driver 30 is seated in the driving seat 40 based on the detection results of the seating sensors 3a to 3c.

The driver monitoring device 11 acquires the number of persons seated, representing the number of seated persons detected by the seating sensors 3a to 3c disposed for the respective seats 41 to 43 other than the driving seat of the vehicle 10, based on the seating signals output from the seating sensors 3a to 3c. The driver monitoring device 11 compares the number of seated people with the number of passengers.

In the example shown in FIG. 2B, the number of seated people is 1, and the number of passengers is 1. Since the number of seated people matches the number of passengers, the driver monitoring device 11 determines that the driver 30 is not seated in the driving seat 40.

In the example shown in FIG. 2C, the driver 30 is seated in the driving seat 40 but is facing the passenger seat 41 instead of facing the front of the vehicle 10. The monitor image does not show the face of the driver 30 facing forward with respect to the monitoring camera 2. Based on the monitor image, the driver monitoring device 11 determines that the driver 30 is not seated in the driving seat 40.

In this example shown in FIG. 2C, however, the number of seated people is zero, and the number of passengers is 1. The driver monitoring device 11 determines that the driver 30 is seated in the driving seat 40 if the number of seated people is one less than the number of passengers.

As mentioned above, the driver monitoring device 11 of this embodiment can immediately and rapidly determine whether or not the driver 40 is sitting in the driving seat 40, by using the seating sensors 3a to 3c in the seats other than the driving seat, when it has been determined that the driver is not seated in the driving seat based on an image taken near the driving seat.

Figure 3:
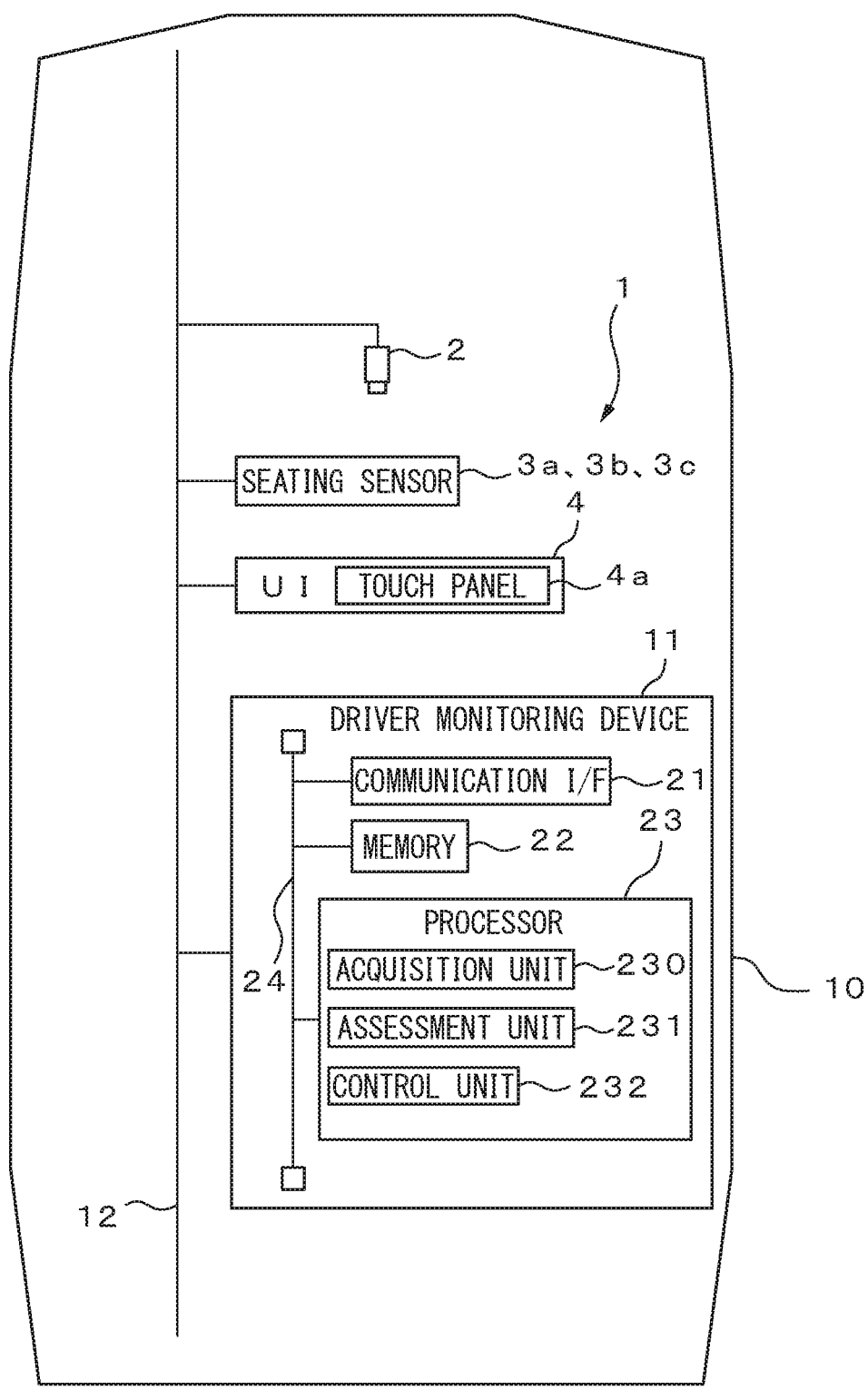
FIG. 3 is a general schematic drawing of a vehicle in which a monitoring system is mounted that includes a driver monitoring device of the embodiment.

FIG. 3 is a general schematic drawing of a vehicle 10 in which a monitoring system 1 is mounted that includes a driver monitoring device 11 of the embodiment. The monitoring system 1 has a monitoring camera 2, seating sensors 3a, 3b, 3c, a user interface (UI) 4, and a driver monitoring device 11, etc.

The monitoring camera 2, seating sensors 3a, 3b, 3c, UI 4 and driver monitoring device 11 are connected in a communicable manner via an in-vehicle network 12 conforming to the Controller Area Network standard.

The monitoring camera 2 is disposed in the compartment 10A in a manner allowing it to photograph monitor images including the face of the driver driving the vehicle 10. The monitoring camera 2 is an example of an imaging unit. The monitor image shows the condition near the driving seat. The monitoring camera 2 is disposed on the steering column 50, for example, as shown in FIG. 1B. The monitoring camera 2 may also be disposed on the steering wheel, room mirror, meter panel or meter hood in the compartment.

The monitoring camera 2 takes monitor images including the face of the driver, at monitor image photographing times with a predetermined cycle, for example. The monitoring camera 2 has a 2D detector composed of an array of photoelectric conversion elements with infrared sensitivity, such as a CCD or C-MOS, and an imaging optical system that forms an image of the photographed region on the 2D detector. The predetermined cycle may be 0.1 to 0.5 second, for example. The monitoring camera 2 preferably has a lighting device in addition to the 2D detector. The lighting device is an LED (light emitting diode), and for example, it may consist of two near-infrared LEDs situated on either side of the imaging optical system. Illuminating the driver with near-infrared light allows the driver's face to be imaged without causing discomfort for the driver even during low-illuminance periods such as nighttime. A bandpass filter that removes light of wavelength components other than near-infrared is built into the imaging optical system, and a visible light cut filter that removes light other than near-infrared light irradiated from a near-infrared LED may also be provided at the front of the lighting device.

Seating sensors 3a, 3b, 3c are disposed in the seats other than the driving seat 40 of the vehicle 10. The seating sensor 3a is disposed in the passenger seat 41, the seating sensor 3b is disposed in the right back seat 42, and the seating sensor 3c is disposed in the left back seat 43. The seating sensors 3a to 3c detect seating of passengers and output a seating signal indicating that they are seated to the driver monitoring device 11. The seating sensors 3a to 3c preferably continue to output the seating signals to the driver monitoring device 11 while detecting seating of the passengers. The seating sensors 3a to 3c may employ pressure sensors, for example. A pressure sensor outputs a seating signal when it detects a pressure at or above a predetermined reference pressure, and does not output the seating signal when it has detected a pressure less than the reference pressure.

The UI 4 is an example of the notification unit. The UI 4 is controlled by the driver monitoring device 11 and notifies the driver of a seating notification requesting the driver to sit in the driving seat in a manner that can be imaged by the monitoring camera 2. The UI 4 has a display device 4a such as a liquid crystal display or touch panel, for display of the seating notification. Information displayed on the display device 4a is preferably also visible to the passengers seated in the back seats 42, 43 of the compartment 10A. The UI 4 may also have an acoustic output device (not shown) to notify the driver of the seating notification. The UI 4 also has a touch panel or operating button, for example, as an input device for inputting operation information from the driver to the vehicle 10. The operation information may be the number of passengers, for example. The UI 4 outputs the input operation information to the driver monitoring device 11 via the in-vehicle network 12.

The driver monitoring device 11 carries out acquisition processing, assessment processing and control processing. For this purpose, the driver monitoring device 11 has a communication interface (IF) 21, a memory 22 and a processor 23. The communication interface 21, memory 22 and processor 23 are connected via signal wires 24. The communication interface 21 has an interface circuit to connect the driver monitoring device 11 with the in-vehicle network 12.

The memory 22 is an example of a memory unit, and it has a volatile semiconductor memory and a non-volatile semiconductor memory, for example. The memory 22 stores an application computer program and various data to be used for information processing carried out by the processor 23. The memory 22 also stores monitor images input from the monitoring camera 2, in association with the monitor imaging times.

All or some of the functions of the driver monitoring device 11 are functional modules driven by a computer program operating on the processor 23, for example. The processor 23 has an acquisition unit 230, an assessment unit 231 and a control unit 232. The assessment unit 231 is an example of the first assessment unit, second assessment unit, third assessment unit and fourth assessment unit. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The driver monitoring device 11 is an electronic control unit (ECU), for example. The driver monitoring device 11 estimates the degree to which the driver is contributing to driving based on the monitor image. Operation of the driver monitoring device 11 will be described in detail below.

Figure 4:
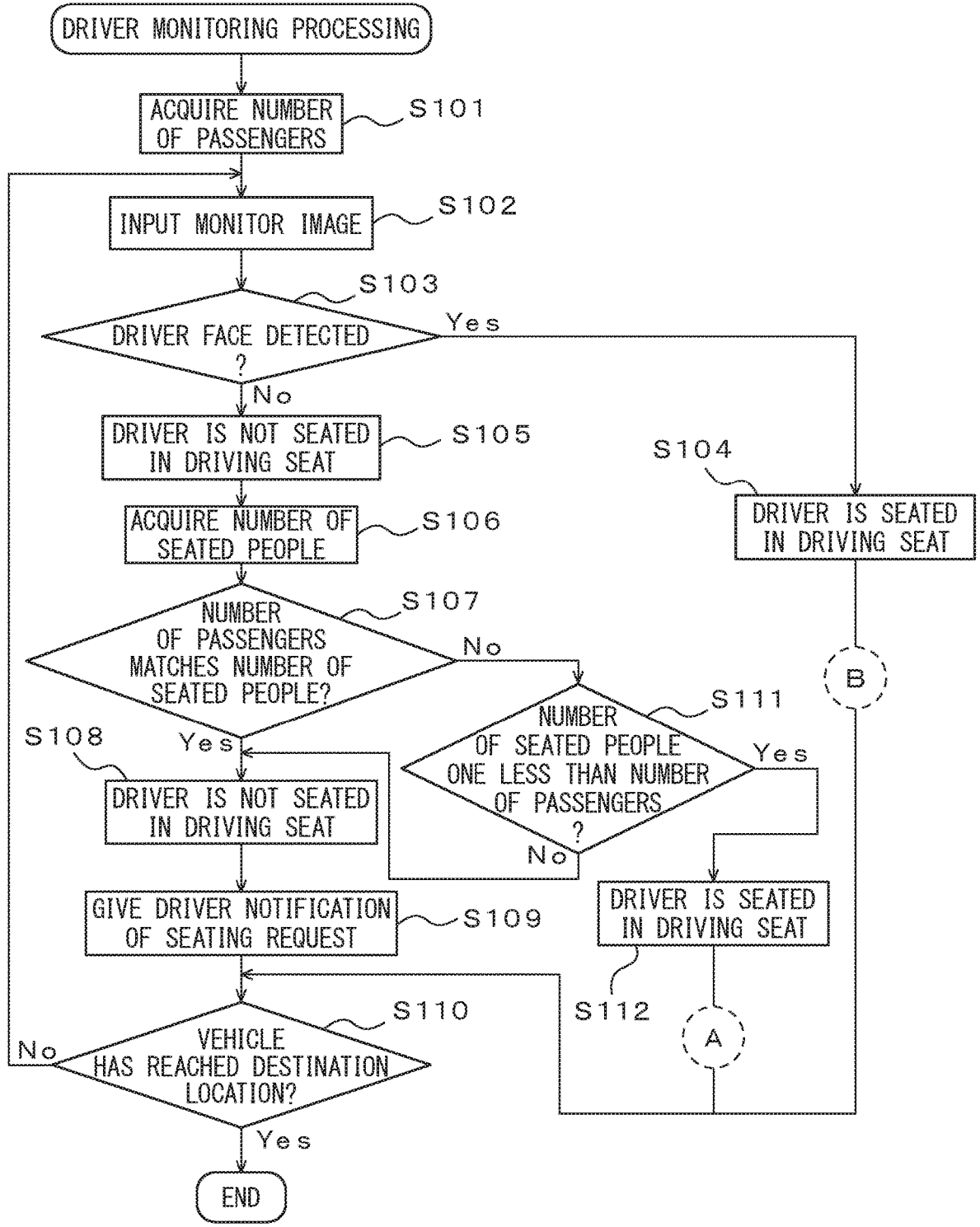
FIG. 4 is an example of an operation flow chart for driver monitoring processing by the driver monitoring device of the embodiment.

FIG. 4 is an example of an operation flow chart for driver monitoring processing by the driver monitoring device 11 of this embodiment. Driver monitoring processing by the monitoring system 1 will be described below with reference to FIG. 4.

First, the acquisition unit 230 acquires the number of passengers indicating the number of passenger persons in the vehicle 10 when the vehicle 10 begins to travel (step S101). For example, the driver monitoring device 11 acquires the number of passengers input by the driver 30 through the UI 4. When it has been determined that the driver 30 is seated in the driving seat 40 based on the monitor image taken by the monitoring camera 2, the acquisition unit 230 may also acquire the number of passengers as 1 added to the number of seated people detected using the seating sensors 3a to 3c. The acquisition unit 230 may also acquire the number of passengers as the number of seated people plus 1, after having notified the driver 30 of a notification requesting the driver to sit in the driving seat 40. In this case, the number of passengers includes the number of items (objects) loaded onto the seat, but this does not affect driver monitoring processing so long as the loaded item remains on the seat.

The time when the vehicle 10 begins to travel is, for example, a point before the vehicle 10 begins to travel on the navigation route or a point when a passenger has boarded the vehicle 10. The point when the acquisition unit 230 has acquired the number of passengers, may also be when the vehicle 10 begins to travel.

The assessment unit 231 carries out step S102 to step S111 each time a monitor image is input.

The assessment unit 231 inputs a monitor image from the monitoring camera 2 (step S102). Each time a monitor image is taken, the monitoring camera 2 outputs the monitor image and the monitor imaging time at which the monitor image was taken, to the driver monitoring device 11 via the in-vehicle network 12. The assessment unit 231 stores the monitor image in the memory 22 in association with the monitor imaging time.

The assessment unit 231 then determines whether or not the face of the driver 30 has been detected, based on the monitor image (step S103). The assessment unit 231 has a construction including an classifier that has learned to detect human faces by input of a monitor image. The classifier inputs a monitor image and detects a face in the monitor image while outputting the reliability of the detected face. The reliability is represented as a numerical value from 0.0 to 1.0, for example. The assessment unit 231 determines that the face of the driver 30 has been detected if the reliability is at least a predetermined reference reliability (such as 0.7). On the other hand, the assessment unit 231 determines that the face of the driver 30 has not been detected if the reliability is less than the predetermined reference reliability.

When the face of the driver 30 has been detected (step S103—Yes), the assessment unit 231 determines that the driver 30 is seated in the driving seat 40 (step S104). the assessment unit 231 may also determine that the driver 30 is seated in the driving seat 40 when a predetermined different body part of the driver 30 has been detected.

The assessment unit 231 then determines whether or not the vehicle 10 has reached the destination location (step S110). If the vehicle 10 has not yet reached the destination location, processing returns to step S102. If the vehicle 10 has reached the destination location, the series of processing steps is complete. For example, the assessment unit 231 may determine whether or not the vehicle 10 has reached the destination location based on input of the current location of the vehicle 10 and the destination location of the navigation route from a navigation device (not shown).

If the face of the driver 30 is not detected, the assessment unit 231 determines that driver 30 is not seated in the driving seat 40 (step S105).

The assessment unit 231 then acquires the number of persons seated (step S106). The assessment unit 231 acquires the number of persons seated, based on seating signals input from the seating sensors 3a to 3c disposed for each of the seats other than the driving seat 40 in the vehicle 10.

The assessment unit 231 then compares the number of seated people and the number of passengers and determines whether or not the number of seated people matches the number of passengers (step S107).

If the number of seated people matches the number of passengers (step S107—Yes), the assessment unit 231 determines that the driver 30 is not seated in the driving seat 40 (step S108). In this case, the driver 30 may have moved to another seat other than the driving seat 40.

The control unit 232 then notifies the driver 30, via the UI 4, of a seating notification requesting the driver to sit in the driving seat 40 in a manner that can be imaged by the monitoring camera 2 (step S109). The seating notification is displayed on the display device 4a, for example. The seating notification may also be given to the driver by voice. The seating notification may also be given to the driver by voice in addition to display on the display device 4a.

The assessment unit 231 then determines whether or not the vehicle 10 has reached the destination location (step S110). If the vehicle 10 has not yet reached the destination location, processing returns to step S102. If the vehicle 10 has reached the destination location, the series of processing steps is complete.

When the number of seated people does not match the number of passengers (step S107—No), the assessment unit 231 determines whether or not the number of seated people is one less than the number of passengers (step S111).

If the number of seated people is one less than the number of passengers (step S111—Yes), the assessment unit 231 determines that the driver 30 is seated in the driving seat 40 (step S112). Since the number of persons seated suggests that the driver 30 is not seated in a seat other than the driving seat, it is estimated that the driver 30 is seated in the driving seat 40. The reason why the face of the driver 30 was not detected in the monitor image may be that the face of the driver 30 was not facing the front of the vehicle 10.

The assessment unit 231 then determines whether or not the vehicle 10 has reached the destination location (step S110). If the vehicle 10 has not yet reached the destination location, processing returns to step S102. If the vehicle 10 has reached the destination location, the series of processing steps is complete.

If the number of seated people is not one less than the number of passengers, on the other hand (step S111—No), the assessment unit 231 determines that the driver 30 is not seated in the driving seat 40 (step S108). The condition in the compartment 10A may be that a loaded item that is not included in the number of passengers is placed on a seat other than the driving seat.

The control unit 232 then notifies the driver 30, via the UI 4, of a seating notification requesting the driver to sit in the driving seat 40 in a manner that can be imaged by the monitoring camera 2 (step S109).

The assessment unit 231 then determines whether or not the vehicle 10 has reached the destination location (step S110). If the vehicle 10 has not yet reached the destination location, processing returns to step S102. If the vehicle 10 has reached the destination location, the series of processing steps is complete.

A specific example of driver monitoring processing by the driver monitoring device 11 will now be explained with reference to FIG. 2A to FIG. 2C, FIG. 5A and FIG. 5B.

In the example shown in FIG. 2A, the number of passengers is 1, and the driver 30 is seated in the driving seat 40 and facing toward the front of the vehicle 10. The face of the driver 30 facing forward with respect to the monitoring camera 2 appears in the monitor image. If the face of the driver 30 is facing a direction within a predetermined range with respect to the optical axis of the monitoring camera 2, then the assessment unit 231 will be able to detect the face in the monitor image (high reliability). The assessment unit 231 determines that the driver 30 is seated in the driving seat 40 based on the monitor image.

In the example shown in FIG. 2B, the number of passengers is 1, and the driver 30 is seated in the back seat 42. During driving of the vehicle at autonomous control level 3, the driver 30 is not demanded to always be in a condition allowing manipulation of the vehicle 10, and therefore the driver 30 may move to the back seats 42, 43 where there is wider space. The face of the driver 30 does not appear in a detectable manner in the monitor image (low reliability). Based on the monitor image, the driver monitoring device 11 determines that the driver 30 is not seated in the driving seat 40. A seating signal is input to the assessment unit 231 from the seating sensor 3b situated on the back seat 42. The number of seated people is 1, and the number of passengers is 1. Since the number of seated people matches the number of passengers, the assessment unit 231 determines that the driver 30 is not seated in the driving seat 40.

When the driver 30 that has been given the seating notification moves from the back seat 42 to the driving seat 40 and sits in the driving seat 40 toward the front of the vehicle 10, the driver monitoring device 11 determines that the driver 30 is seated in the driving seat 40 based on the monitor image. The driver monitoring device 11 can thus raise the degree of contribution of the driver 30 to driving.

In the example shown in FIG. 2C, the number of passengers is 1, and the driver 30 is seated in the driving seat 40 but is facing the passenger seat 41 instead of facing the front of the vehicle 10. The driver may also place the seat in the reclined position so as to assume a relaxed posture. The monitor image does not show the face of the driver 30 facing forward with respect to the monitoring camera 2. Since the face of the driver 30 is facing a direction outside of the predetermined range with respect to the optical axis of the monitoring camera 2, the face of the driver 30 does not appear in a detectable manner in the monitor image (low reliability). The assessment unit 231 determines that the driver 30 is not seated in the driving seat 40 based on the monitor image.

Since nobody is sitting in the seats other than the driving seat, no seating signal is input to the assessment unit 231. The number of seated people is zero, and the number of passengers is 1. Since the number of seated people is one less than the number of passengers, the driver monitoring device 11 determines that the driver 30 is seated in the driving seat 40. The control unit 232 then notifies the driver 30 of a seating notification requesting the driver to sit in the driving seat 40 in a manner that can be imaged by the monitoring camera 2.

When the driver 30 that has been given the seating notification sits facing the front of the vehicle 10, the assessment unit 231 determines that the driver 30 is seated in the driving seat 40 based on the monitor image. The driver monitoring device 11 can thus raise the degree of contribution of the driver 30 to driving.

Figure 5A:
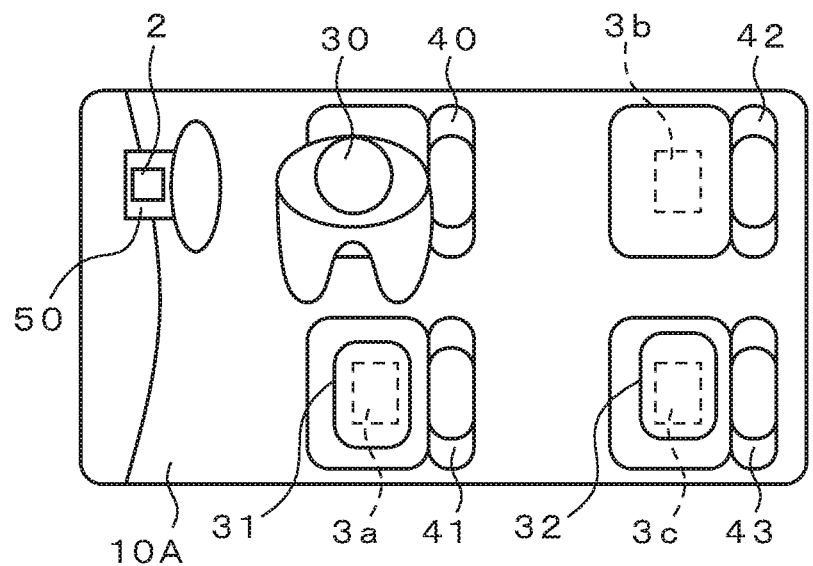
FIG. 5A is a diagram showing an example of a seat and driver state in a compartment (4).

In the example shown in FIG. 5A, the number of passengers is 1, and the driver 30 is seated in the driving seat 40 but is facing a loaded item placed in the passenger seat 41 instead of facing the front of the vehicle 10. Since the face of the driver 30 is facing a direction outside of the predetermined range with respect to the optical axis of the monitoring camera 2, the face of the driver 30 does not appear in a detectable manner in the monitor image (low reliability). The assessment unit 231 determines that the driver 30 is not seated in the driving seat 40 based on the monitor image.

Furthermore, since the item 31 is placed on the passenger seat 41 and the object 32 is placed on the back seat 43, seating signals are input to the assessment unit 231 from the seating sensor 3a disposed on the passenger seat 41 and seating sensor 3c disposed on the back seat 43. The number of seated people is 2, and the number of passengers is 1. Since the number of seated people does not match the number of passengers and the number of seated people is not one less than the number of passengers, the assessment unit 231 determines that the driver 30 is not seated in the driving seat 40. The control unit 232 then notifies the driver 30 of a seating notification requesting the driver to sit in the driving seat 40 in a manner that can be imaged by the monitoring camera 2.

When the driver 30 that has been given the seating notification sits facing the front of the vehicle 10, the assessment unit 231 determines that the driver 30 is seated in the driving seat 40 based on the monitor image. The driver monitoring device 11 can thus raise the degree of contribution of the driver 30 to driving.

Figure 5B:
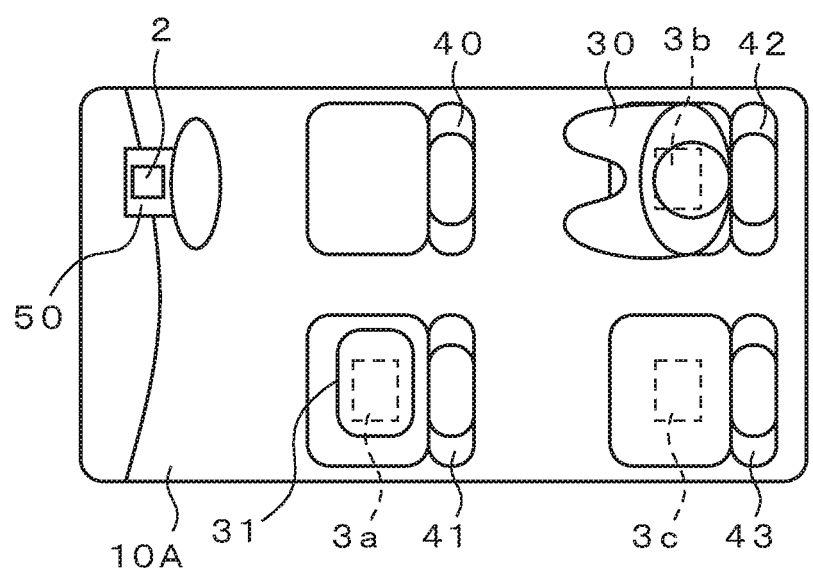
FIG. 5B is a diagram showing an example of a seat and driver state in a compartment (5).

In the example shown in FIG. 5B, the number of passengers is 1, and the driver 30 is seated in the back seat 42. The face of the driver 30 does not appear in a detectable manner in the monitor image. The assessment unit 231 determines that the driver 30 is not seated in the driving seat 40 based on the monitor image.

Furthermore, since the driver 30 is seated in the back seat 42 and the item 31 is placed on the passenger seat 41, seating signals are input to the assessment unit 231 from the seating sensor 3a disposed on the passenger seat 41 and seating sensor 3b disposed on the back seat 42. The number of seated people is 2, and the number of passengers is 1. Since the number of seated people does not match the number of passengers and the number of seated people is not one less than the number of passengers, the assessment unit 231 determines that the driver 30 is not seated in the driving seat 40. The control unit 232 then notifies the driver 30 of a seating notification requesting the driver to sit in the driving seat 40 in a manner that can be imaged by the monitoring camera 2.

When the driver 30 that has been given the seating notification moves from the back seat 42 to the driving seat 40 and sits in the driving seat 40 facing the front of the vehicle 10, the assessment unit 231 determines that the driver 30 is seated in the driving seat 40 based on the monitor image. The driver monitoring device 11 can thus raise the degree of contribution of the driver 30 to driving.

As mentioned above, the driver monitoring device of this embodiment can immediately and rapidly determine whether or not the driver is sitting in the driving seat, by using the seating sensors in the seats other than the driving seat, when it has been determined that the driver is not seated in the driving seat based on an image taken near the driving seat.

Figure 6:
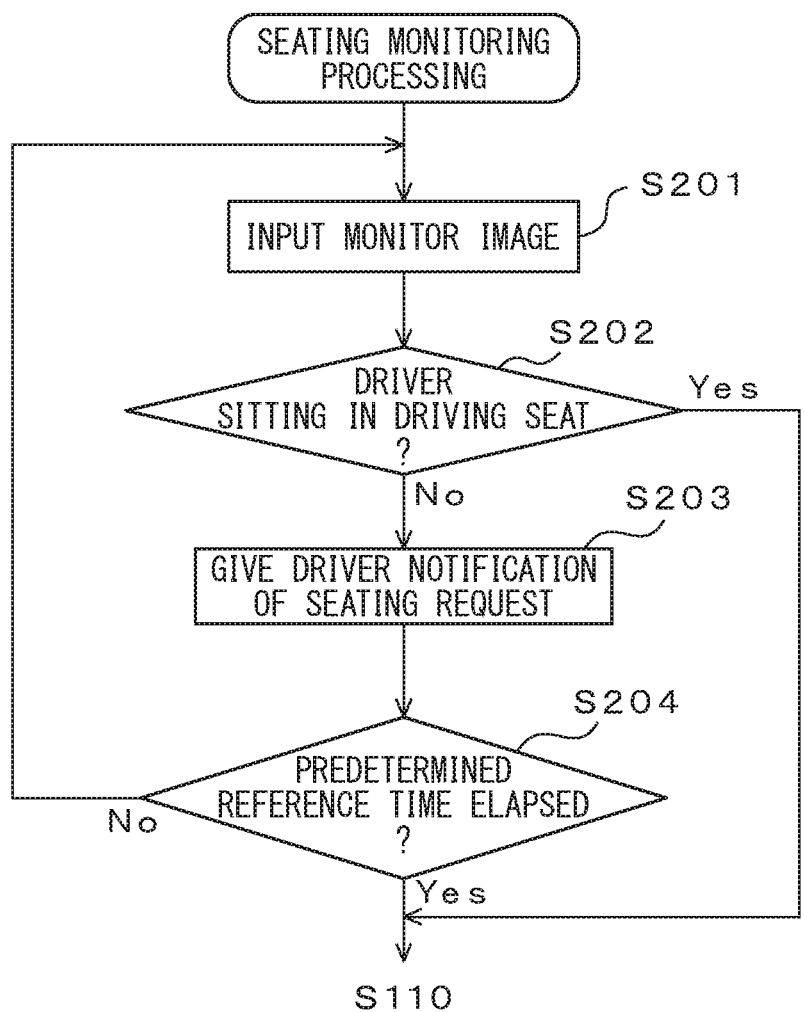
FIG. 6 is an operation flow chart as Modified Example 1 for driver monitoring processing by the driver monitoring device of the embodiment.

Modified Example 1 and Modified Example 2 of the driver monitoring device 11 of this embodiment will now be described with reference to the drawings. FIG. 6 is an operation flow chart as Modified Example 1 for driver monitoring processing by the driver monitoring device of the embodiment.

In this Modified Example, the seating monitoring processing (processing A) shown in FIG. 6 is carried out between step S112 and step S110 of the operation flow chart shown in FIG. 4.

First, after it has been determined that the driver 30 is seated in the driving seat 40 (step S112), the assessment unit 231 inputs a monitor image from the monitoring camera 2 (step S201). The processing of FIG. 4 is not carried out during the seating monitoring processing of this Modified Example.

The assessment unit 231 then determines whether or not the driver 30 is seated in the driving seat 40, based on the monitor image (step S202).

If the driver 30 is seated in the driving seat 40 (step S202—Yes), processing proceeds to step S110.

If the driver 30 is not seated in the driving seat 40 (step S202—No), the control unit 232 notifies the driver 30, via the UI 4, of a seating notification requesting the driver to sit in the driving seat 40 in a manner that can be imaged by the monitoring camera 2 (step S203).

The assessment unit 231 then determines whether or not a predetermined reference time has elapsed (step S204) after it has been determined that the driver 30 is seated in the driving seat 40 (step S112).

If the predetermined reference time has elapsed, processing proceeds to step S110. If the predetermined reference time has not elapsed, processing return to step S201.

The reason why the driver 30 is not seated in the driving seat 40 in step S105 may be that the face of the driver 30 is not facing the front of the vehicle 10. For this Modified Example, therefore, the driver 30 is given a seating notification only if the face of the driver 30 continues to be in a state that is not facing the front of the vehicle 10 for a predetermined reference time after it has been determined that the driver 30 is seated in the driving seat 40 (step S112). When the driver 30 that has been given the seating notification then faces the front of the vehicle 10 and sits in the driving seat 40, the driver monitoring device 11 determines that the driver 30 is seated in the driving seat 40 based on the monitor image. The driver monitoring device 11 can thus raise the degree of contribution of the driver 30 to driving.

FIG. 7 is an operation flow chart as Modified Example 2 for driver monitoring processing by the driver monitoring device 11 of the embodiment.

In this Modified Example, object number assessment processing (processing B) shown in FIG. 7 is carried out between step S104 and step S110 of the operation flow chart shown in FIG. 4.

First, after it has been determined that the driver 30 is seated in the driving seat 40 (step S104), the assessment unit 231 acquires the number of persons seated (step S301).

The assessment unit 231 then compares the number of seated people representing the number of seated persons as detected by seating sensors 3*a* to 3*c*, with the number of passengers, and determines whether or not the number of seated people is greater than the value of the number of passengers minus 1 (step S302).

If the number of seated people is greater than the value of the number of passengers minus 1 (step S302—Yes), the assessment unit 231 calculates the value of 1 plus the number of seated people minus the number of passengers, as the number of objects placed on seats other than the driving seat (step S303), and processing proceeds to step S110.

If the number of seated people is not greater than the value of the number of passengers minus 1 (step S302—No), processing proceeds directly to step S110.

If it has been determined that the driver 30 is not seated in the driving seat 40 (step S105) in the processing shown in FIG. 4 after the number of objects has been calculated (step S302), the assessment unit 231 compares the number of persons seated with the number of passengers in step S107, and if the value of the number of seated people minus the number of objects matches the number of passengers, then it is determined that the driver 30 is not seated in the driving seat 40. If it has been determined that the driver 30 is not seated in the driving seat 40 (step S105) in the processing shown in FIG. 4 after the number of objects has been calculated (step S302), the assessment unit 231 determines that the driver 30 is seated in the driving seat 40 if the number of seated people minus the number of objects is one less than the number of passengers in step S111.

The processing by the driver monitoring device 11 in this Modified Example will now be explained with reference to FIG. 8.

Figure 8A:
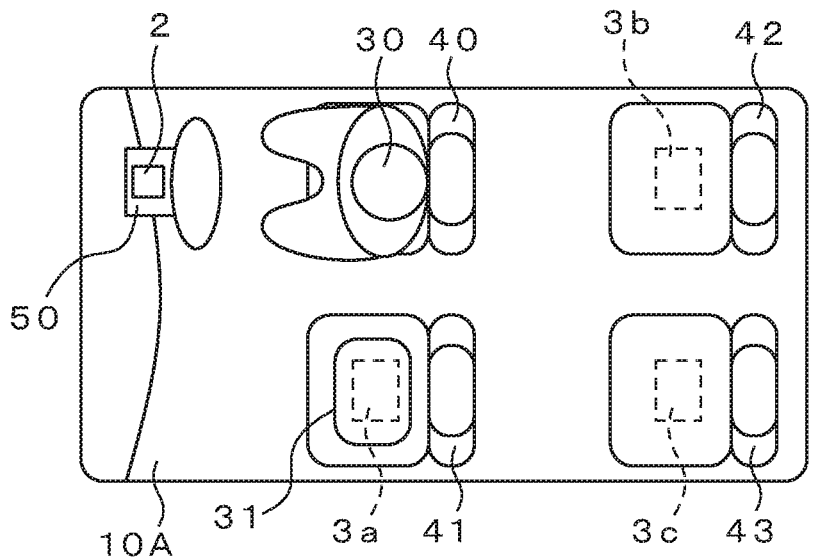
FIG. 8A is a diagram showing an example of a seat and driver state in a compartment (6).

First, in the driver monitoring processing shown in FIG. 4, the number of passengers is 1, and the driver 30 is seated in the driving seat 40 and facing the front of the vehicle 10, as shown in FIG. 8A. An item 31 has been placed in the passenger seat 41. The assessment unit 231 determines that the driver 30 is seated in the driving seat 40 based on the monitor image (step S104).

In the object number assessment processing shown in FIG. 7, a seating signal is then input to the assessment unit 231 from the seating sensor 3*a* disposed in the passenger seat 41. The number of persons seated is 1, and the number of passengers is 1. Since the number of seated people (1) is greater than the value of the number of passengers (1) minus 1 (0), the assessment unit 231 calculates the value of 1 plus the number of seated people (1) minus the number of passengers (1) (=1), as the number of objects placed on seats other than the driving seat.

Driver monitoring processing shown in FIG. 4 after calculation of the number of objects will now be explained with reference to FIG. 8B and FIG. 8C.

Figure 8B:
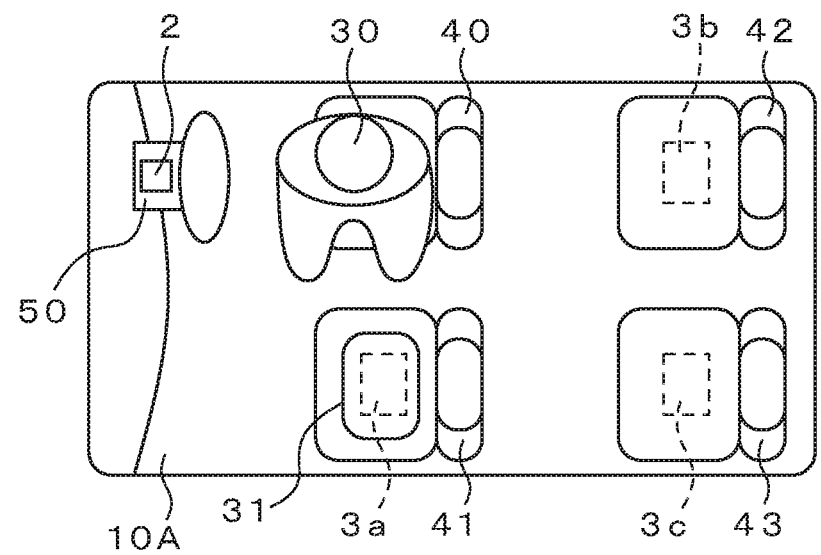
FIG. 8B is a diagram showing an example of a seat and driver state in a compartment (7).

In the example shown in FIG. 8B, the driver 30 is seated in the driving seat 40 but is facing the item 31 placed on the passenger seat 41 instead of facing the front of the vehicle 10. The assessment unit 231 determines that the driver 30 is not seated in the driving seat 40 based on the monitor image.

A seating signal is input to the assessment unit 231 from the seating sensor 3a disposed on the passenger seat 41. Since the value of the number of seated people (1) minus the number of objects (1) (=0) is one less than the number of passengers (1), the assessment unit 231 determines that the driver 30 is seated in the driving seat 40.

Figure 8C:
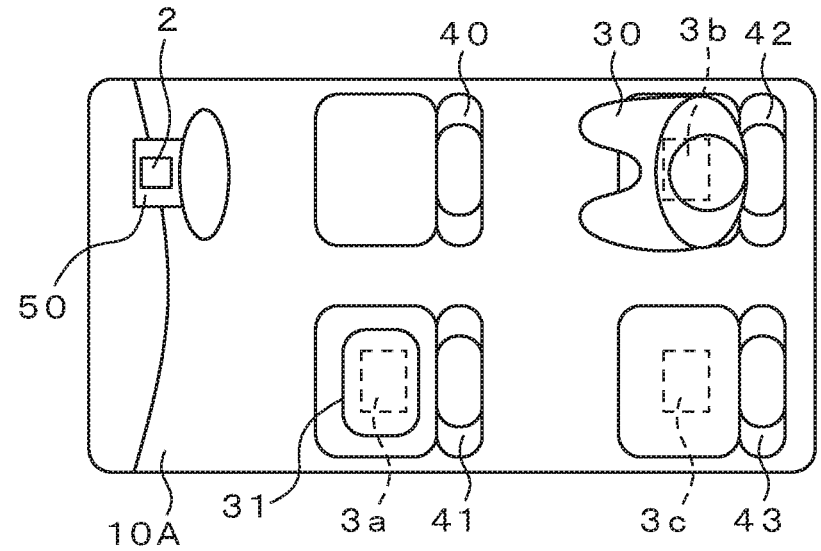
FIG. 8C is a diagram showing an example of a seat and driver state in a compartment (8).

In the example shown in FIG. 8C, the driver 30 is seated in the back seat 42. The assessment unit 231 determines that the driver 30 is not seated in the driving seat 40 based on the monitor image.

Seating signals are input to the assessment unit 231 from the seating sensor 3a disposed on the passenger seat 41 and the seating sensor 3b disposed on the back seat 42. Since the value of the number of seated people (2) minus the number of objects (1) (=1) matches the number of passengers (1), the assessment unit 231 determines that the driver 30 is not seated in the driving seat 40.

In the examples shown in FIG. 8B and FIG. 8C, the control unit 232 notifies the driver 30 of a seating notification requesting the driver 40 to sit in the driving seat 40 in a manner that can be imaged by the monitoring camera 2.

When the driver 30 that has been given the seating notification sits in the driving seat 40 facing the front of the vehicle 10, the assessment unit 231 then determines that the driver 30 is seated in the driving seat 40 based on the monitor image. The driver monitoring device 11 can thus raise the degree of contribution of the driver 30 to driving.

It is possible that an item may be placed on a seat other than the driving seat after the vehicle 10 has started traveling. In this Modified Example, the number of objects such as loaded items placed on a seat other than the driving seat is calibrated against the number of persons seated, and therefore the driver can be more accurately monitored even when a loaded item has been placed on a seat other than the driving seat.

The driver monitoring device, computer program for driver monitoring and driver monitoring method according to the embodiments described in the present disclosure may incorporate appropriate modifications that still fall within the gist of the disclosure. Moreover, the technical scope of the disclosure is not limited to these embodiments, and includes the invention and its equivalents as laid out in the Claims.

For example, when it has been determined that the driver is not seated in the driving seat, the assessment unit may use an classifier that has learned to identify human hands, arms or trunks to examine the presence of the driver's body in an image taken by the monitoring camera, and to determine whether or not the driver is seated in the driving seat in a state with the seat placed in the reclined position. When it has been determined that the driver is seated in the driving seat in a state with the seat placed in the reclined position, the control unit may give the driver a seating notification via the notification unit.

The invention claimed is:

1. A driver monitoring device comprising:
    a processor configured to
        acquire number of passengers that are occupying a vehicle when the vehicle has begun to travel,
        determine whether or not a driver is sitting in a driving seat based on an image near the driving seat of the vehicle which has been taken by an imaging unit, and
        determine that the driver is not sitting in the driving seat if number of seated people, representing number of people that are sitting as detected by a seating sensor situated in each seat other than the driving seat of the vehicle, matches the number of passengers, and determine that the driver is sitting in the driving seat if the number of seated people is one less than the number of passengers, when it has been determined that the driver is not sitting in the driving seat.

2. The driver monitoring device according to claim 1, wherein the processor is further configured to notify the driver to sit in the driving seat via a notification unit, when it has been determined that the driver is not sitting in the driving seat.

3. The driver monitoring device according to claim 1, wherein the processor is further configured to determine whether or not the driver is sitting in the driving seat based on multiple images taken by the imaging unit, during a predetermined time after assessment, when it has been determined that the driver is sitting in the driving seat.

4. The driver monitoring device according to claim 3, wherein the processor is further configured to notify the driver to sit in the driving seat via a notification unit, when it has been determined that the driver is not sitting in the driving seat.

5. The driver monitoring device according to claim 1, wherein the processor is further configured to notify the driver to sit in the driving seat via a notification unit, when the number of seated people does not match the number of passengers and the number of seated people is also not one less than the number of passengers.

6. The driver monitoring device according to claim 1, wherein the processor is further configured to
    compare the number of seated people with the number of passengers, and if the number of seated people is greater than the value of the number of passengers minus 1, calculate the value of one added to the number of seated people minus the number of passengers as the number of objects placed on seats other than the driving seat, in cases where it has been determined that the driver is sitting in the driving seat, and
    determine that the driver is not sitting in the driving seat if the number of seated people minus the number of objects matches the number of passengers, or determine that the driver is sitting in the driving seat if the number of seated people minus the number of objects is one less than the number of passengers, after the number of objects has been calculated, in cases where it has been determined that the driver is not sitting in the driving seat.

7. A computer-readable, non-transitory storage medium storing a computer program for driver monitoring, which causes a processor execute a process, the process comprising:
    acquiring number of passengers that are occupying a vehicle when the vehicle has begun to travel;
    determining whether or not a driver is sitting in a driving seat based on an image near the driving seat of the vehicle which has been taken by an imaging unit; and
    determining that the driver is not sitting in the driving seat if number of seated people, representing number of people that are sitting as detected by a seating sensor situated in each seat other than the driving seat of the vehicle, matches the number of passengers, or determining that the driver is sitting in the driving seat if the number of seated people is one less than the number of passengers, in cases where it has been determined that the driver is not sitting in the driving seat.

8. A driver monitoring method carried out by a driver monitoring device and the method comprising:

acquiring number of passengers that are occupying a vehicle when the vehicle has begun to travel;

determining whether or not a driver is sitting in a driving seat based on an image near the driving seat of the vehicle which has been taken by an imaging unit; and determining that the driver is not sitting in the driving seat if number of seated people, representing number of people that are sitting as detected by a seating sensor situated in each seat other than the driving seat of the vehicle, matches the number of passengers, or determining that the driver is sitting in the driving seat if the number of seated people is one less than the number of passengers, in cases where it has been determined that the driver is not sitting in the driving seat.

\* \* \* \* \*